Feb. 27, 1934.   A. J. GRANBERG   1,948,984
AUTOMATIC CONTROL FOR FLUID METERING SYSTEMS
Filed May 2, 1932   4 Sheets-Sheet 1

INVENTOR,
Albert J. Granberg
BY
Townsend & Loftus
ATTORNEYS.

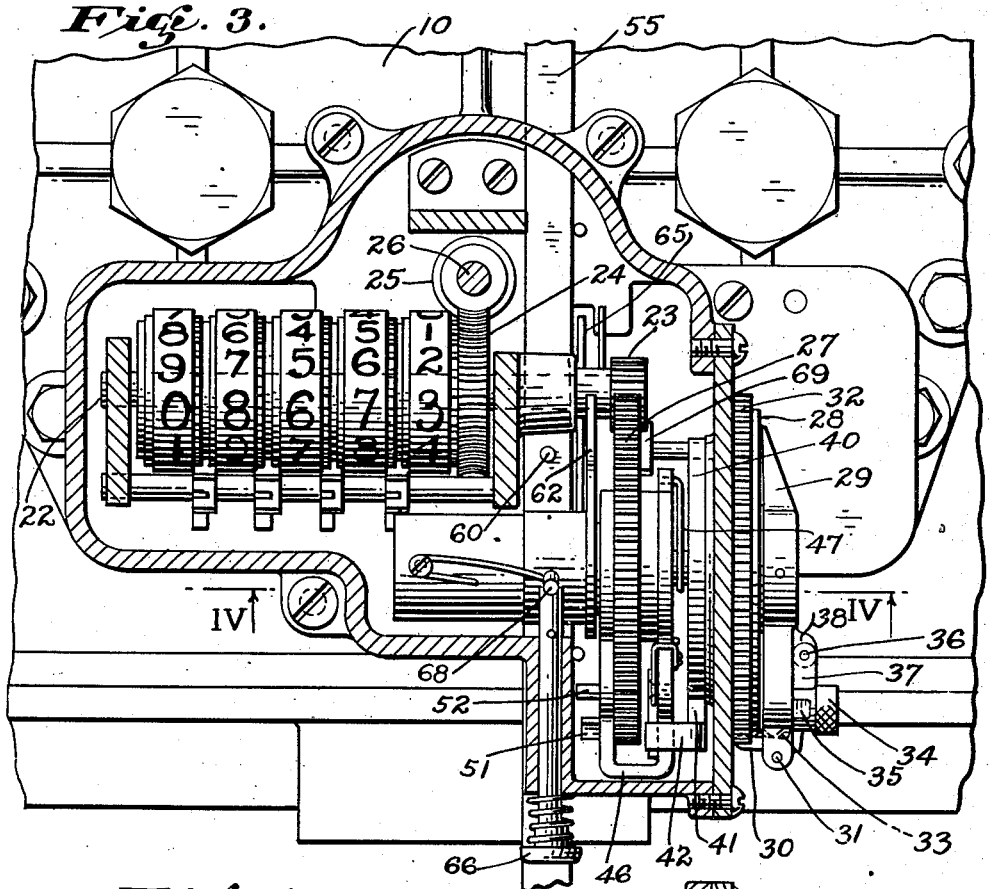
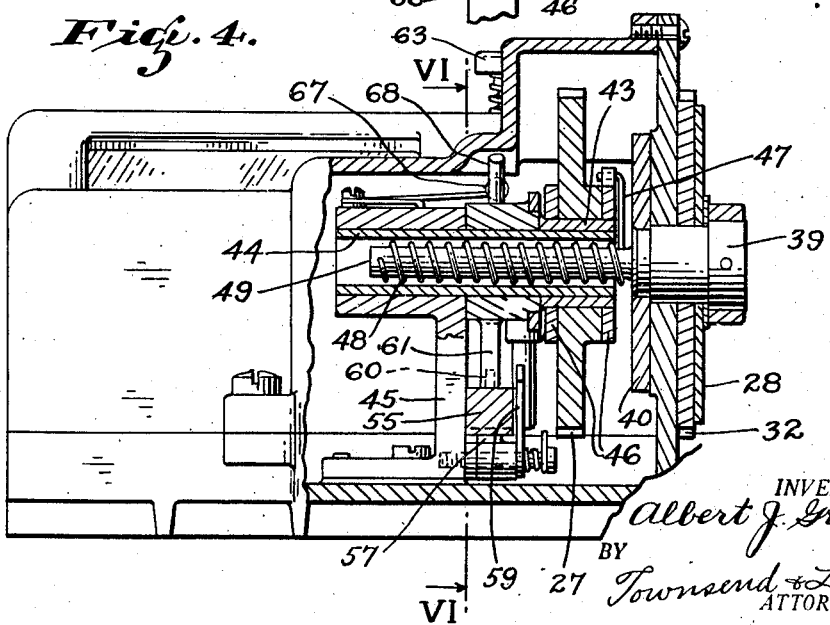

Feb. 27, 1934.  A. J. GRANBERG  1,948,984
AUTOMATIC CONTROL FOR FLUID METERING SYSTEMS
Filed May 2, 1932  4 Sheets-Sheet 3
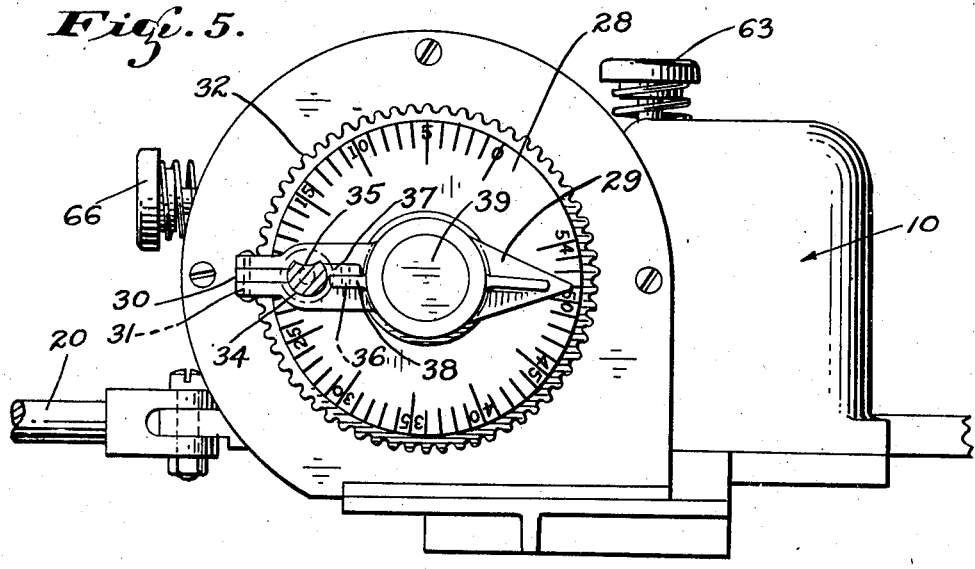
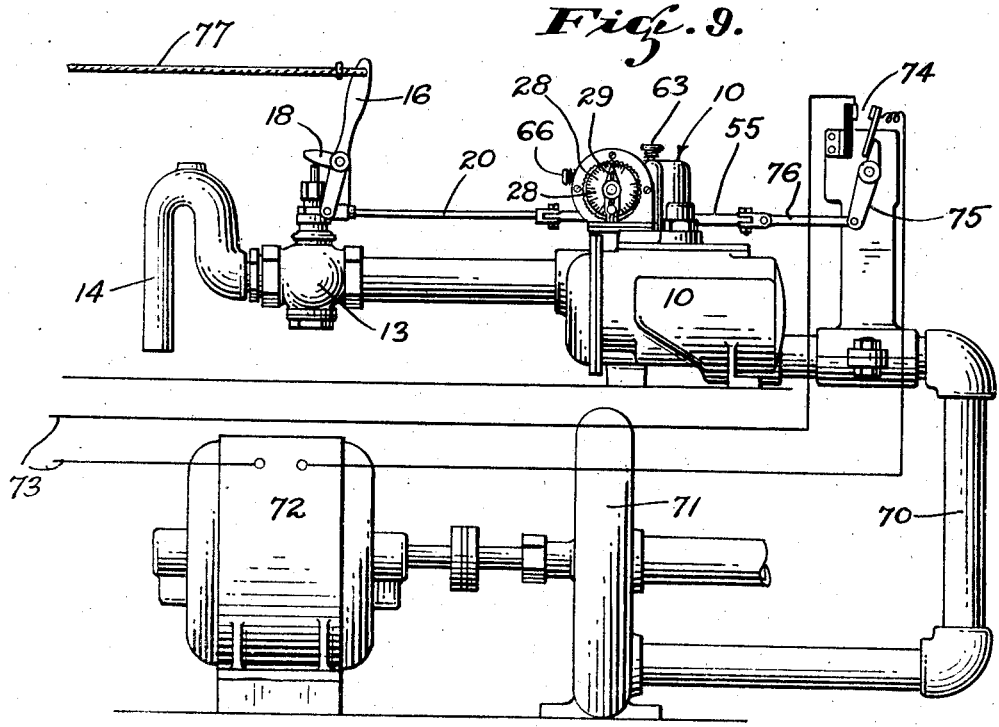
INVENTOR.
Albert J. Granberg
BY
Townsend & Loftus
ATTORNEYS.

Feb. 27, 1934.  A. J. GRANBERG  1,948,984
AUTOMATIC CONTROL FOR FLUID METERING SYSTEMS
Filed May 2, 1932   4 Sheets-Sheet 4
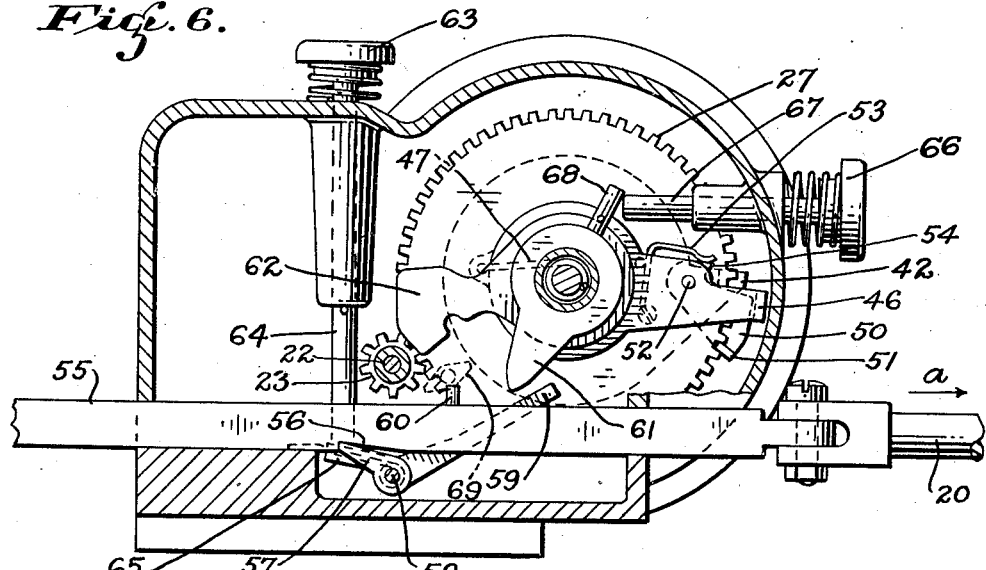
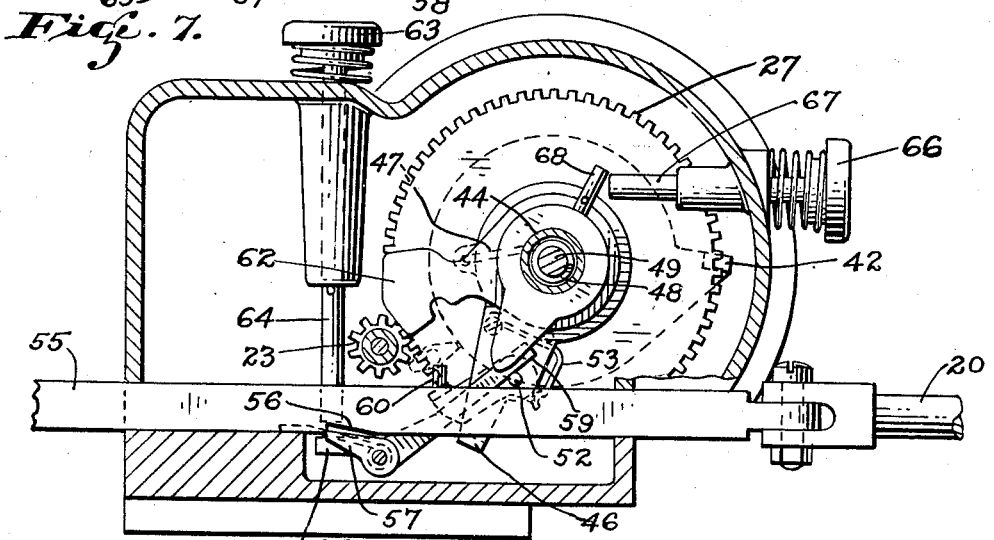
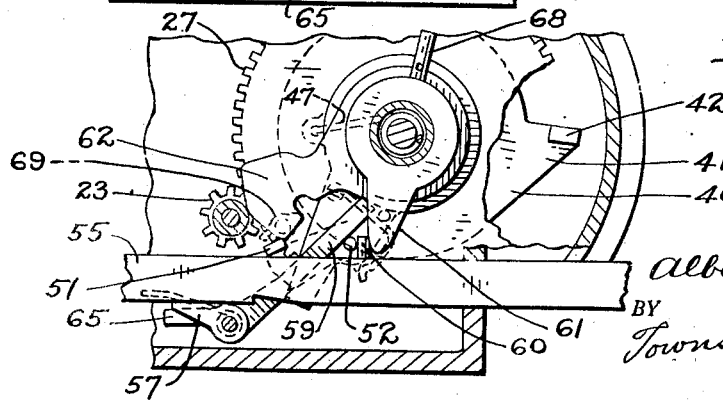
INVENTOR.
Albert J. Granberg
BY
Townsend + Loftus
ATTORNEYS.

Patented Feb. 27, 1934

1,948,984

UNITED STATES PATENT OFFICE 1,948,984

AUTOMATIC CONTROL FOR FLUID METERING SYSTEMS

Albert J. Granberg, Berkeley, Calif., assignor to Ralph N. Brodie Company, Oakland, Calif., a corporation of California Application May 2, 1932. Serial No. 608,646

4 Claims. (Cl. 221—101)

This invention relates to automatic controls for fluid metering systems and more particularly to a device that is capable of being set to shut-off a control valve when a predetermined amount of fluid has been delivered through a fluid meter.

The object of the present invention is to provide a device for use in connection with fluid storage tanks such, for example, as are mounted on gasoline delivery trucks or at gasoline dispensing stations and to provide such a device with means whereby the amount of gasoline or fluid to be delivered each time the control valve is opened may be accurately predetermined.

This object is accomplished by means of a control valve shut-off mechanism driven by a gasoline meter of standard design. Such, for example, as the type shown in by Letters Patent of the United States #1,811,789 issued June 23, 1931.

The driving connection is taken from the meter shaft that serves to drive a totalizing mechanism. The shut-off mechanism may be set to permit the control valve to deliver any desired quantity of fluid so that when the control valve is opened it will remain open until such quantity has been delivered and then be automatically shut-off.

Upon shutting off of the control valve, the shut-off device is also automatically reset so as to be in position to accurately determine the amount of fluid delivered the next time the valve is opened.

Other objects and advantages of my invention will more clearly appear from an understanding of my invention.

One form which the invention may assume is exemplified in the following description and illustrated by way of example in the accompanying drawings in which:

Fig. 3 is a sectional view taken on the line III—III of Fig. 1.

Fig. 4 is a sectional view taken on the line IV—IV of Fig. 3.

Fig. 5 is an enlarged view of the shut-off mechanism shown in Fig. 1 with parts shown in section.

Figs. 6, 7 and 8 are sectional views taken on the line VI—VI of Fig. 3, each view showing the mechanism as it appears during different phases of its operation.

Fig. 9 is an elevation disclosing a modification of the invention by which it is adapted to be used where the fluid is delivered by a motor driven pump rather than by gravity from a storage tank.

Figure 1:
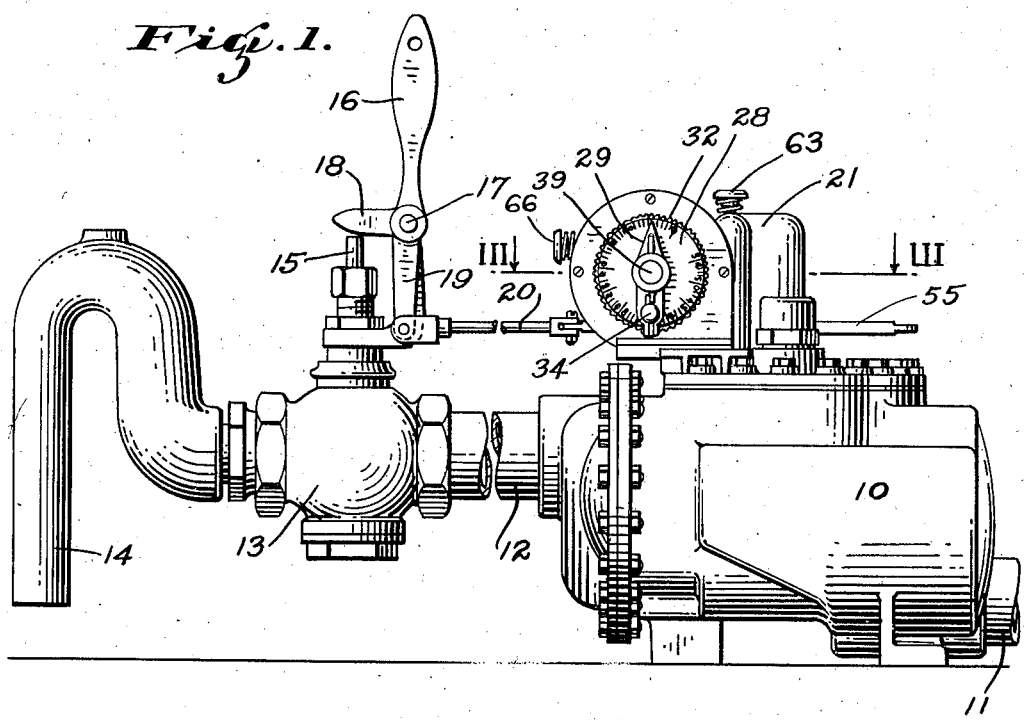
Fig. 1 is a side elevation of the device embodying my invention.
Figure 2:
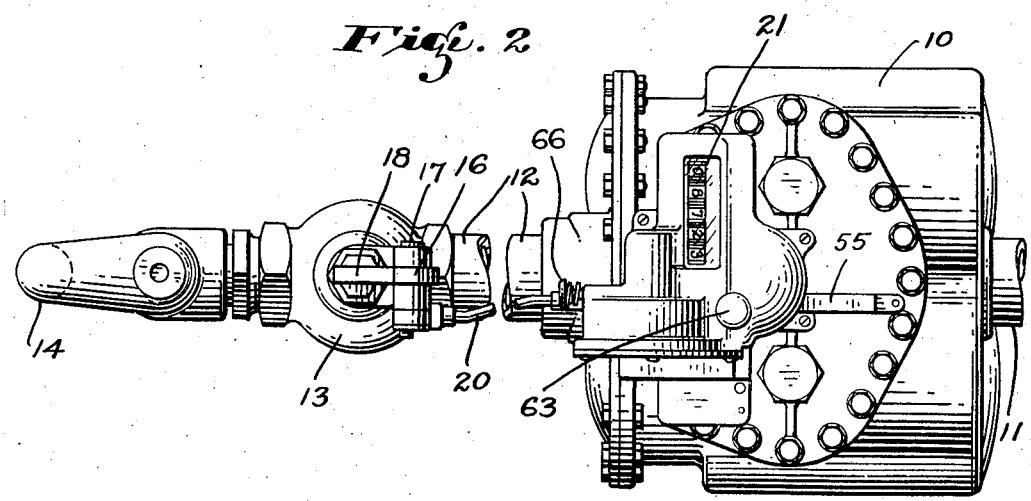
Fig. 2 is a plan view of the device illustrated in Fig. 1.

Referring more particularly to the drawings, Fig. 1 shows a fluid meter 10 which may be of any standard design. The meter is disposed in a case which has an inlet connection 11 in communication with a fluid storage tank (not shown) and an outlet connection 12 communicating with a control valve 13, which valve controls the flow of fluid through a standard type of outlet nozzle 14. The valve 13 is also one of well known construction preferably being a globe valve having a valve element normally urged to a closed position by a spring (not shown) and adapted to be opened by depression of a reciprocal valve stem 15 extending outwardly from the valve bonnet.

An actuating lever 16 pivoted at 17 is provided with an arm 18 which upon actuation of the lever 16 depresses the stem 15 to open the valve. A downwardly extending arm 19 on the lever 16 is connected by a rod 20 with the shut-off and measuring device as will be hereinafter described.

Fixed to the top of the meter casing 10, as is standard practice is a totalizer 21. The totalizer shown in Fig. 3 is also of well known construction and need not be more specifically described herein, except to say that it comprises a rotary shaft 22 to one end of which is fixed a pinion gear 23. The shaft 22 also carries a worm gear 24 in mesh with a worm 25, which worm is fixed to a shaft 26. The shaft 26 extends upwardly from the interior of the meter housing 10 and is rotated by the mechanism and the meter housing when fluid is passing therethrough. Hence, when the valve 13 is opened by means of the lever 16, fluid flows through the meter causing the shaft 26 to revolve. The shaft 26, through the worm 25 and the worm gear 24 revolves the main shaft 22 of the totalizer and consequently the pinion gear 23 is caused to revolve. The pinion 23 is in mesh with a master gear or main rotor 27 as is best shown in Figs. 6, 7 and 8.

From the foregoing it will appear that for each gallon of fluid passing through the meter the master gear or rotor 27 will be caused to revolve a predetermined amount. Hence, in order to limit the volume of fluid that is to be delivered by the valve 13 after having passed through the meter it will only be necessary to close the valve after the rotor 27 has moved a predetermined distance. This is accomplished through the following mechanism.

Disposed exteriorly of the casing which surrounds the master gear 27, as best shown in Figs. 3 and 5 is a dial plate 28 provided with a scale marked off to represent gallons. A rotatable pointer member 29 is employed for indicating the number of gallons that the measuring device is set to deliver. This member 29 is provided with a point at its distal end and its opposite end is provided with a pawl 30 pivoted at the point 31. This pawl is engageable with serrations or teeth 32 formed about the outer periphery of the dial plate 28.

It should here be noted that the teeth 32 are of exactly the same size and number as are the teeth of the master gear 27. The pawl 30 is urged out of engagement with the teeth 32 by means of a spring 33 but is maintained in engagement with the teeth by the rotatable shaft of a knurled button 34. The shaft of the button 34 is provided with a cut-away portion 35 so that upon rotation of the button to such a position that the pawl registers with the cut-away portion 35, the pawl will be urged by the spring 33 to a position out of engagement with the teeth 32. When in this position the pointer 29 is free to be rotated and set at any desired point on the dial 28. When the pointer has been set, the button 34 is rotated so that its shaft forces the pawl into engagement with the teeth 32 and if desired the pointer may be permanently sealed by passing a wire through registering holes 36 formed in a pair of wing like extensions 37 and 38, the extension 37 being formed on the shaft of the button 34 and the extension 38 being a part of the pointer 29. When a piece of wire has been passed through the holes 36 its ends may be twisted together and sealed in any conventional manner, thus preventing rotation of the button 34, and consequently preventing release of the pawl 30.

The pointer 29 is fixed to a shaft 39, which shaft extends through the housing and carries plate 40 at its inner end. The plate 40, as best illustrated in Figs. 3, 6, 7 and 8, is generally disk shaped and has a radial projection 41 which is provided at its outermost end with an inwardly projecting member which may be best termed a stop lug 42.

It should now be noted that the master gear 27 rotates independently of the dial and pointer mechanism except as will be hereinafter set forth. The master gear is mounted to freely rotate on a bushing 43, (see Fig. 4) which is carried by a hollow sleeve 44 supported in a bracket 45 which may be screwed or otherwise suitably secured to the interior of the housing.

A U-shaped bracket 46 is also mounted for rotation about the bushing 43 (see Figs. 3 and 4) and is urged in a counter clockwise direction by means of the arm 47 of a spring 48, which spring is coiled about a reduced extension of the pointer supporting shaft 39. This reduced extension illustrated at 49 is disposed concentrically within the hollow sleeve 44. The outer end of the U-shaped bracket 46 is provided with a pawl 50, as shown in Fig. 6. The pawl 50 has a lug 51 at its end for engagement with the teeth of the master gear 27 and is pivoted on a pin 52.

A spring 53 frictionally engages the pawl 50 adjacent a cam like projection 54 the spring 53 serving as a detent to frictionally retain the pawl in either its engaged or disengaged position.

Referring again to the valve actuating lever 16, it will be noted that this lever is connected by the rod 20 to a sliding bar 55 extending through the housing. This bar 55 is provided with a notch 56 engageable by a spring pressed pawl 57 pivoted at 58 and provided with a releasing lever 59.

The operation of the device as so far described is as follows: Assuming that it is desired to fill a number of ten gallon containers, the dial pointer would be set to the numeral ten on the dial thus regulating the position of the stop lug 42 with relation to the master gear 27. The actuating lever 16 would then be operated to depress the valve stem 15, opening the control valve. Upon movement of the actuating lever the slidable bar 55 would be moved by means of the connecting rod 20 in the direction of the arrow a in Fig. 6. The pawl 57 would then become engaged with the notch 56 retaining the bar 55 in this position and thus holding the control valve open.

The position of the parts, before the fluid starts to flow, is illustrated in Fig. 6 in which the spring arm 47 has urged the U-shaped bracket 46 in a counter-clockwise direction until its movement has been stopped by the stop lug 42, which lug also has engaged the pawl 50 causing the lug 51 thereof to fall into engagement with the teeth of the master gear 27.

Upon opening of the control valve the fluid starts to flow through the meter with the result that the shaft 26 revolves and through the worm 25, worm gear 24 and shaft 22 imparts rotation to the pinion 23 which in turn rotates the master gear 27 in a clockwise direction. Upon rotating the master gear pulls the U-shaped bracket 46 along with it due to its connection with this bracket through the pawl 50.

When the desired predetermined quantity of fluid has been passed through the meter the U-shaped bracket has been swung around to the position illustrated in Fig. 7, in which position the pivot pin 52 of the pawl 50 which pin extends outwardly from the face of the bracket contacts the release arm 59 of the pawl 57, thus forcing the pawl 57 out of engagement with the bar 55 and permitting this bar to slide back to its normal position. The spring in the valve 13 has sufficient tension to both close the valve and move the bar 55.

This bar 55 is provided with an upwardly projecting lug 60 so that upon return movement of the bar, the lug 60 engages an extension 61 of a releasing cam 62 which is mounted for pivotal movement coaxially with the master gear 27. The extension 61 and the releasing cam 62 are fixed with relation to each other so that upon return movement of the bar 55 the lug 60 causes the cam 62 to swing in a counter-clockwise direction to engage the lug 51 of the pawl 50, as illustrated in Fig. 8. In this figure the cam 62 is shown as it first contacts the lug 51, but as it moves a little farther it forces the lug 51 out of engagement with the teeth of the master gear 27, the lug being held in this position by the frictional engagement of the spring 53 with the pawl 50. As a result the tension of the spring arm 47 swings the U-shaped bracket 46 back to the position illustrated in Fig. 6, in which position the mechanism is set to measure another predetermined quantity of fluid the next time the valve is opened, it being understood that when the bracket 46 swings back, the pawl 50 strikes against the lug 42, again forcing the pawl into engagement with the teeth of the gear 27.

Thus, if the operator desires to fill a number of ten gallon containers, the pointer is set to the numeral ten on the dial and the valve is opened. Exactly ten gallons of fluid will flow through the meter and the valve will be automatically closed and the measuring mechanism reset so that upon reopening of the valve another ten gallons of fluid is accurately measured as it flows into a container.

An emergency shut-off button 63 is provided so that if an emergency arises and it becomes necessary to close the control valve before the desired amount of fluid has passed through the meter, the operator may do so. This button 63 is supported by a shaft 64 reciprocably mounted in the housing and engaged at its inner end with an arm 65 fixed with relation to the pawl 57.

Thus, when it is desired to stop the flow of gasoline, the button 63 is depressed to throw the pawl 57 out of engagement with the bar 55, which immediately permits the control valve to move to its closed position.

When it is desired to change the volume of fluid delivered, for example, so that twenty gallons of fluid is delivered instead of ten, each time the valve is opened, the pointer 29 must first be set to zero on the dial. This, referring to Figs. 6, 7 and 8, causes the stop lug 42 to swing in a clockwise direction and urges the U-shaped bracket 46 to a position corresponding to that shown in Fig. 8. During this motion of the U-shaped bracket 46 the lug 51 of the pawl 50 will ride over the teeth of the master gear 27. When the stop lug 52 is turned back with the pointer to the position at which it is to be set, the pawl 50 will remain in engagement with the gear teeth in the position shown in Fig. 8.

After the pointer has been properly set a button 66 carried by a reciprocal shaft 67 is depressed, the shaft 67 engages an extension pin 68 on the inner end of the releasing cam 62. In this manner the releasing cam 62 is swung in a counter-clockwise direction releasing the pawl 50 as hereinbefore described and permitting the U-shaped bracket to swing back under the tension of the spring arm 67 until it contacts the stop lug 52.

In order to prevent jamming of the mechanism in case the operator should hold the control valve open too long, a stationary cam 69 is positioned to interrupt the pawl 50 and throw it out of engagement with the teeth of the master gear. In the event that this occurs the U-shaped bracket swings back into engagement with the stop lug 52 and the operation of the device is repeated without closing of the control valve.

The cam 69 is also valuable in case it is desired to deliver two or more times the amount of fluid for which the measuring device has been set. In such case it is merely necessary that the valve be held open and fluid will be continuously delivered until the valve is released and the automatic shut-off mechanism causes it to close.

A modified form of the invention is shown in Fig. 9, in which figure the meter 10 is shown as connected in a pipe line 70 through which fluid is delivered by means of a pump 71 driven by an electric motor 72.

The motor 72 is energized through a pair of conductors 73 in one of which is interposed a switch 74. The switch 74 is more or less diagrammatically illustrated and it will be understood that any conventional type of switch may be used, preferably one which is capable of being actuated by means of an oscillatory lever, such as illustrated at 75.

According to my invention the lever 75, which actuates the switch will be connected as by a link 76 with one end of the bar 55 which, as illustrated above, reciprocates upon opening and closing of the valve 13. Thus, when the actuating lever 16 of the valve 13 is moved to open the valve, the lever 75 is moved through the connecting rod 20, bar 55 and link 76 to close the switch 74 and thus complete a circuit to energize the motor which drives the pump.

Hence, upon opening of the valve, the motor is automatically energized and fluid is delivered through the metering device. Through the same mechanism closing of the valve opens the switch 74 and energizes the motor so that the pumping operation is stopped automatically with the closing of the control valve.

Fig. 9 also shows the valve actuating lever 16 provided with a rope or cable 77 which may lead to any convenient point so that the device may be controlled from a remote position.

From the foregoing it will be apparent that I have provided a relatively simple mechanism that may be set to deliver any desired quantity of fluid upon a single operation of the control valve.

The device is also so constructed that the flow of fluid may be interrupted at any time in case of emergency and in case the valve is held open too long the flow of fluid will continue until twice the amount indicated on the dial has been delivered.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A measuring and shut-off device for a fluid meter and control valve which comprises a rotor rotatable upon operation of the meter, means for holding the control valve open, releasing means adjustably set with relation to the rotor and moveable by the rotor into engagement with said holding means to release the same and permit the control valve to close, and means actuated by closing of the control valve to return said releasing means to the position at which it was set.

2. In combination with a fluid meter and a valve controlling fluid flow therethrough, a rotor actuated by the meter, a bar connected with the valve and extending to a position adjacent the rotor, said bar having a notch formed therein, a pawl engageable with said notch to retain the valve in an open position, resilient means normally tending to close the valve, and means carried by the rotor and engageable with said pawl to release it when the rotor has moved a predetermined distance.

3. In combination with a fluid meter and a valve controlling fluid flow therethrough, a rotor actuated by the meter, a bar connected with the valve and extending to a position adjacent the rotor, said bar having a notch formed therein, a pawl engageable with said notch to retain the valve in an open position, resilient means normally tending to close the valve, and means carried by the rotor and engageable with said pawl to release it when the rotor has moved a predetermined distance, said last-named means being adjustable circumferentially of the rotor to vary the quantity of fluid passing through the valve before it is closed.

4. A measuring and shut-off device for a fluid meter and control valve which comprises a rotor rotatable upon operation of the meter, means for holding the control valve open, a releasing pin, means supporting said pin and normally tending to swing it in a direction opposite to the direction of rotation of the rotor, means adjustable circumferentially of the rotor to limit the movement of the pin and cause it to be retained in a fixed position relative to the rotor, said pin engaging and releasing the valve holding means upon rotation of the rotor, and means actuated by closing movement of the valve for releasing said pin supporting means whereby the pin will be returned to the position of said adjustable means.

ALBERT J. GRANBERG.